(No Model.) 2 Sheets—Sheet 1.
S. H. TIMMONS.
SYSTEM OF APPLYING POWER TO STEAM VESSELS.
No. 404,878. Patented June 11, 1889.
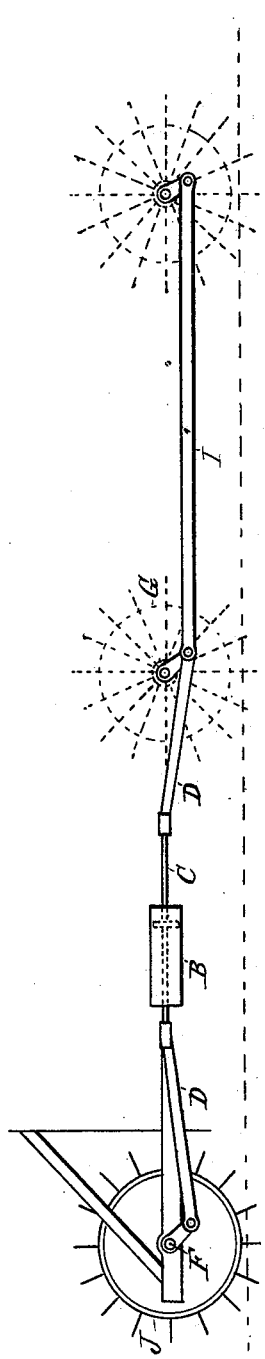
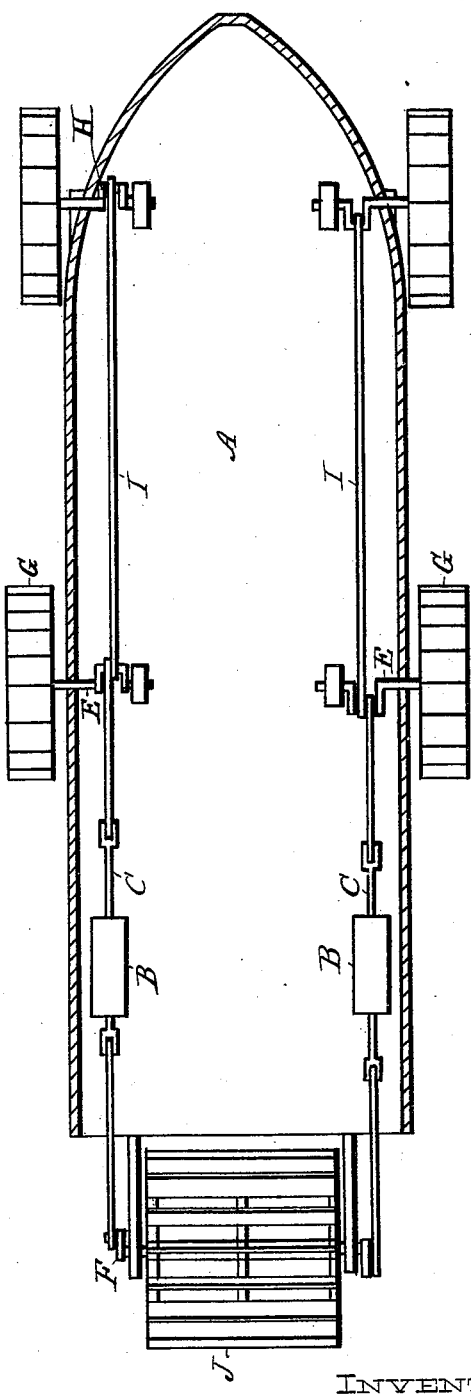
Witnesses:
R. S. Millar
Robert Kirk
Inventor:
Samuel H. Timmons
By J. S. Zerk
Attorney.

(No Model.) 2 Sheets—Sheet 2.
S. H. TIMMONS.
SYSTEM OF APPLYING POWER TO STEAM VESSELS.
No. 404,878. Patented June 11, 1889.
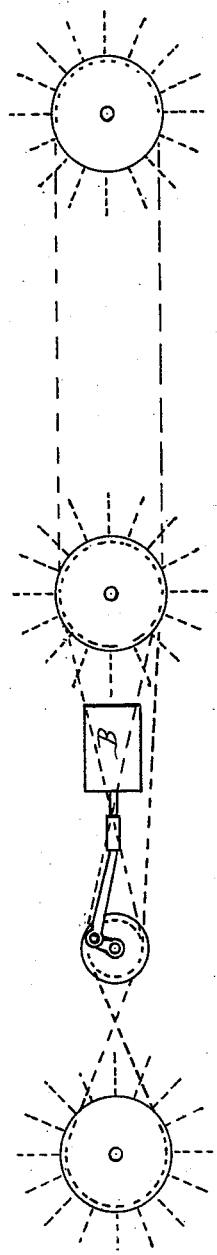
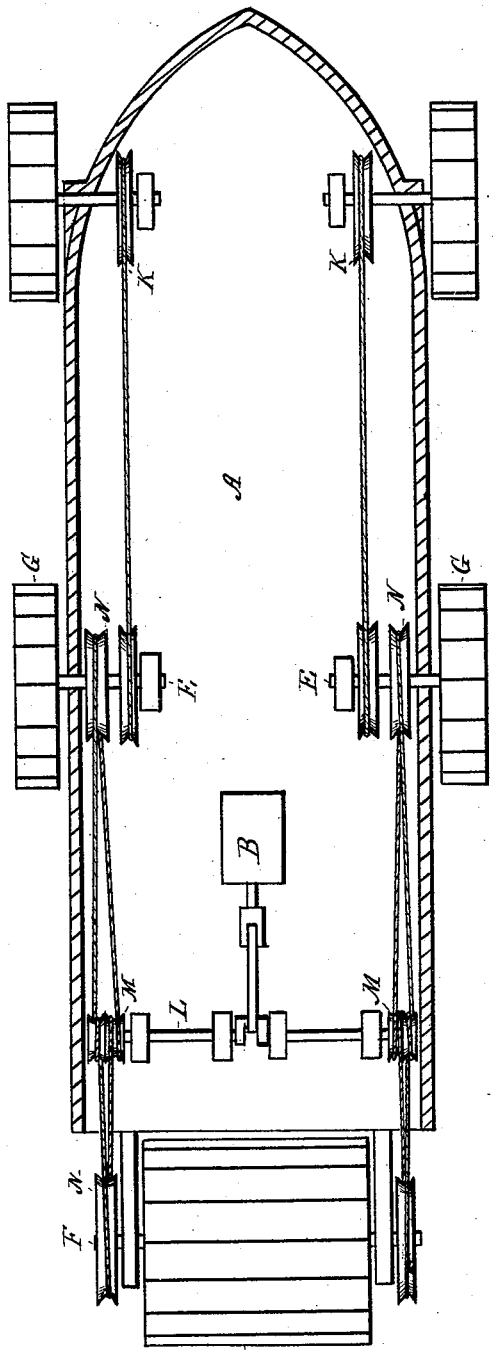
WITNESSES: INVENTOR:

UNITED STATES PATENT OFFICE.

SAMUEL H. TIMMONS, OF EVANSVILLE, INDIANA.

SYSTEM OF APPLYING POWER TO STEAM-VESSELS.

SPECIFICATION forming part of Letters Patent No. 404,878, dated June 11, 1889.

Application filed November 15, 1888. Serial No. 290,964. (No model.)

*To all whom it may concern:*

Be it known that I, SAMUEL H. TIMMONS, of Evansville, in the county of Vanderburg and State of Indiana, have invented a new and useful Improvement in Systems of Distributing and Applying Power on Vessels, which improvement is fully set forth in the following specification and accompanying drawings, in which—

Figure 1 is a side view of the engine and propeller-wheels in position on a vessel. Fig. 2 is a top or plan view of the same; Fig. 3, a side view showing a modification of the same in its application to short-stroke engines, and Fig. 4 a top or plan view of the same.

It is the object of this invention to provide a system for distributing the power of the propeller-wheels, so as to form as great an area as possible, and to distribute these propeller-wheels fore and aft, so as to fully utilize the power of the engine, and thereby greatly increase the speed of the vessel and the safety and comfort of the passengers; and it consists in providing the cylinder of the engine or engines with piston-rods both fore and aft, so that the connecting-rod may be attached to double crank-shafts on both ends of the engine-cylinder. The shafts both forwardly and rearwardly of the engine are provided with propeller-wheels, and, where it is necessary, two or more extra cross-shafts for carrying wheels may be constructed and the extreme shaft run by means of parallel or continuous rods, so that the entire series or train of propeller-shafts may be operated from the engine located at the central point, and the whole working in unison with the wheels separated and distributed along the body of the boat, fully utilizing the power of the engine. It is obvious that by the present plan of concentrating the entire force of the engine on one cylinder-shaft, which has the propeller-wheels at a central point, the water is necessarily churned up by the vigorous action of the single propeller-wheels, and a greater loss in effective power is caused by the fact that the entire force of the engine is caused to act on the water at one point. By duplicating or increasing the number of wheels and locating them at advantageous points along the side of the vessel or at the stern greater buoyancy is given to the hull, and greater resistance is afforded by the water upon which the blades of the wheels act, as will now be set forth in detail.

In the drawings, A represents a boat of any suitable size or structure, having centrally at any convenient point one or more engines B. These engines are preferably placed at the sides of the boat, as shown in Fig. 2, or they may be placed side by side centrally in the boat. The cylinders are equipped with piston-rods C, which project from the cylinder-heads fore and aft, and attached to these piston-rods are connecting-rods D, which connect with the cranks on the forward shaft E and the rear stern-wheel shaft F. The boat is provided with two or more propeller-shafts, as illustrated by the shafts E F, and these shafts are equipped with side wheels G and a stern-wheel J, as shown in Fig. 2.

If a greater number of wheels or propeller-shafts are required on the boat—one on each side of the cylinder—an additional shaft or shafts, either fore or aft, as shown at H, may be placed therein, and connected by means of a connecting parallel rod I to the same wrist-pin that the connecting-rod D is attached to. Instead, however, of having the parallel rod I, grooved wheels and rope, as shown at K, may be employed to transmit the power, or a wire rope used, which is preferable.

In order to adapt my invention for use in short-stroke engines, I provide the engine-shaft L, as shown in Fig. 4, with a double-grooved pulley M, and the fore and aft shafts E F are equipped with a grooved pulley N, so that the high speed of the engine-shaft L may be reduced by transmitting the power from the small pulley M to the large pulleys N by means of a wire rope.

The arrangement, as shown in Figs. 3 and 4, peculiarly adapts it for using my system, whereby the boat is equipped at suitable points along its side by the propeller-wheels, because thereby the transmission of power is equally effected and in a cheap and efficient manner.

What I claim as new is—

A vessel having the stern-wheel and along the sides one or more sets of wheels, the train of wheels on each side and the stern-wheel being operated in unison by an engine provided with a piston-rod in each end of the cylinder, and the connecting parallel rods, substantially as herein set forth.

In testimony that I claim the foregoing I have hereunto set my hand, this 23d day of August, 1888, in the presence of witnesses.

SAMUEL H. TIMMONS.

Witnesses:
J. S. ZERBE,
O. J. BAILEY.